United States Patent
Yu

(10) Patent No.: US 10,787,346 B1
(45) Date of Patent: Sep. 29, 2020

(54) LIFT DEVICE FOR DUST COLLECTION BOX OF WOOD WORKING MACHINE

(71) Applicant: Hsi-Hui Yu, Taichung (TW)

(72) Inventor: Hsi-Hui Yu, Taichung (TW)

( * ) Notice: Subject to any disclaimer, the term of this patent is extended or adjusted under 35 U.S.C. 154(b) by 0 days.

(21) Appl. No.: 16/503,283

(22) Filed: Jul. 3, 2019

(51) Int. Cl.
B66D 1/04 (2006.01)
B23Q 11/00 (2006.01)

(52) U.S. Cl.
CPC ............ B66D 1/04 (2013.01); B23Q 11/0067 (2013.01); *B66D 2700/026* (2013.01)

(58) Field of Classification Search
CPC ...... B66D 1/04; B66D 1/14; B66D 2700/026; B23Q 11/0067
See application file for complete search history.

(56) References Cited

U.S. PATENT DOCUMENTS

| | | | | |
|---|---|---|---|---|
| 4,923,251 A | * | 5/1990 | Funakawa | A47L 9/04 15/308 |
| 5,310,152 A | * | 5/1994 | O'Neill | A47B 81/06 248/324 |
| 7,241,090 B2 | * | 7/2007 | Reynders | B23Q 11/0053 108/24 |
| 7,407,039 B2 | * | 8/2008 | Bailey | B66C 23/208 187/240 |
| 7,556,241 B2 | * | 7/2009 | Geagan | B66D 1/04 254/342 |

* cited by examiner

Primary Examiner — Sang K Kim
Assistant Examiner — Nathaniel L Adams
(74) Attorney, Agent, or Firm — Che-Yang Chen; Law Office of Michael Chen

(57) ABSTRACT

A lift device for a dust collection box of a wood working machine includes a driving shaft unit, a passive shaft unit, a rotary unit, a break unit, a pulley unit and a cable unit. The driving shaft unit and the passive shaft unit are connected to the underside of the working table. The driving shaft unit includes a first gear and a second gear. The passive shaft unit includes a third gear which is engaged with the second gear. The rotary unit is connected to the driving shaft unit to rotate the driving shaft. The break unit is pviotable between a break position and a loose position. When the break unit is at the break position, the break unit prevents the driving shaft from self-rotating. The lift device lifted or lowers the dust collection box by cooperation of the pulley unit and the cable unit the lift device.

9 Claims, 13 Drawing Sheets

LIFT DEVICE FOR DUST COLLECTION BOX OF WOOD WORKING MACHINE

BACKGROUND OF THE INVENTION

1. Fields of the Invention

The present invention relates to a lift device for lifting or lowering a dust collection box relative to the working table of a wood working machine.

2. Descriptions of Related Art

The conventional wood working machine 1 as disclosed in FIG. 1, includes a working table 2 and a machining device 3 is installed to the working table 2 so as to proceed machining tasks to objects.

During machining the objects on the working table 2, wood powder, debris and the like is generated and floats in the air. Therefore, a suction device (not shown) is used to suck the wood powder and debris. Yet the wood powder and debris around the machining device 3 cannot be sucked by the suction device, and a dust collection box 4 is used to collect the wood powder and debris around the machining device 3. A vacuum machine 5 remove the powder and debris from the dust collection box 4 to keep clean around the machining device 3.

The dust collection box 4 is connected to the underside of the working table 2 and is mounted to the machining device 3. However, the dust collection box 4 has to be uninstalled from the underside of the working table 2 when the dust collection box 4 or the machining device 3 needs to be cleaned and has a maintenance. This requires one person to support the dust collection box 4 by hands, and the other person unscrews bolts to separate the dust collection box 4 from the working table 2. It is difficult for doing this by only one person, because the dust collection box 4 may fall down to the floor.

The present invention intends to provide a lift device for lifting or lowering the dust collection box relative to the working table to eliminate the shortcomings mentioned above.

SUMMARY OF THE INVENTION

The present invention relates to a lift device for a dust collection box of a wood working machine, and the lift device comprises a working table with a lift device connected to the underside of the working table. The lift device comprises a driving shaft unit, a passive shaft unit, a rotary unit, a break unit, a pulley unit and a cable unit. The driving shaft unit has a first seat, a second seat and a driving shaft, wherein the first seat and the second seat are fixed to the underside of the working table, and the driving shaft extends through the first seat and the second seat. The driving shaft has a first gear and a second gear mounted thereto. The passive shaft unit is connected to the underside of the working table. A third gear and at least two wheels are connected to the passive shaft unit. The third gear is engaged with the second gear. The rotary unit is connected to the driving shaft to rotate the driving shaft. The break unit has a break member and a resilient member. A control portion and a break portion are respectively formed on two ends of the break member. The break portion is pivotably connected to the first seat and has a rack formed thereto. The break member is pviotable between a break position and a loose position. The resilient member is connected between the first seat and the break portion so as to maintain the break member at the break position where the rack is engaged with the first gear to prevent the driving shaft from self-rotating. The pulley unit has multiple pulleys which are connected to the underside of the working table. The cable unit has at least two cables, and each cable has the first end fixed to the wheel corresponding thereto, and the second end of each cable reeves the pulley corresponding thereto and is connected with the connection portion corresponding thereto.

The primary object of the present invention is to provide a lift device which controls the height of the dust collection box to help the users to install and remove the dust collection box relative to the working table.

Another object of the present invention is to provide a lift device which maintains the dust collection box at a desired height to prevent the dust collection box from dropping to hurt people.

Yet another object of the present invention is to provide a lift device which allows one person to proceed the removal of the dust collection box from the working table.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 2 to 13, the lift device 100 for a dust collection box of a wood working machine of the present invention comprises a working table 10, a dust collection box 20, a lift device 30 and a positioning device 40.

Figure 1:
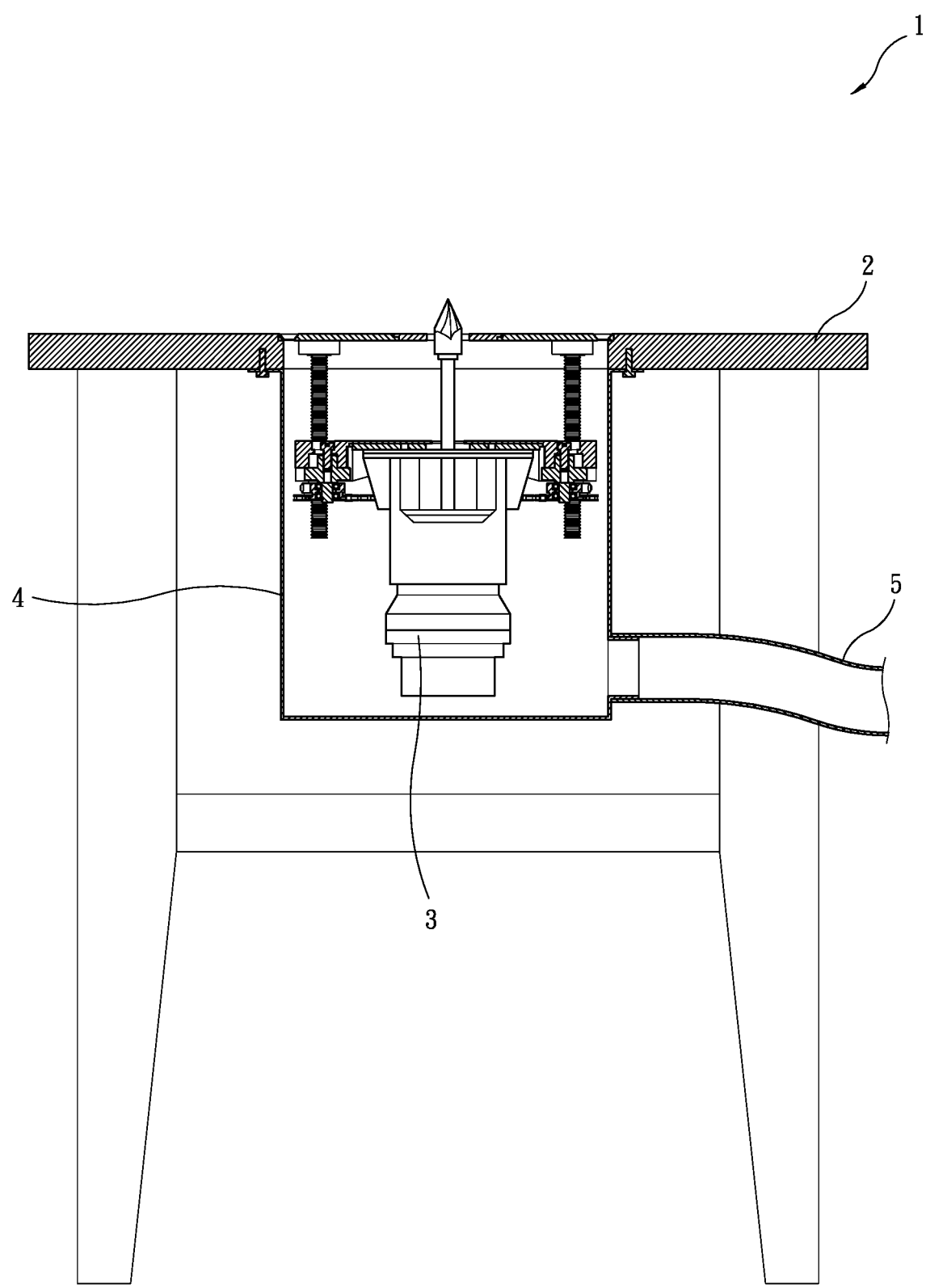
FIG. 1 shows a conventional wood working machine.
Figure 2:
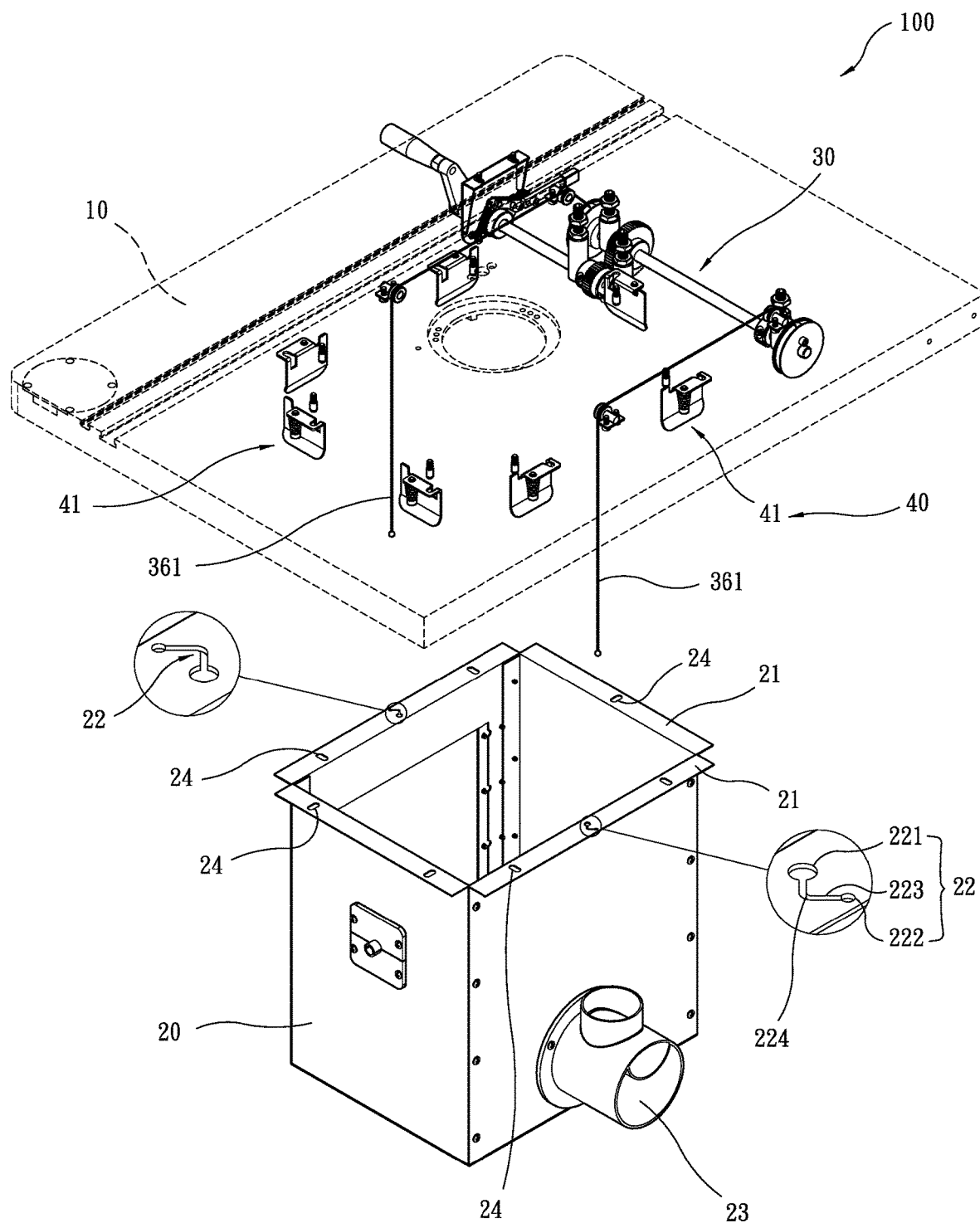
FIG. 2 shows the dust collection box, the working table and the lift device of the present invention.
Figure 3:
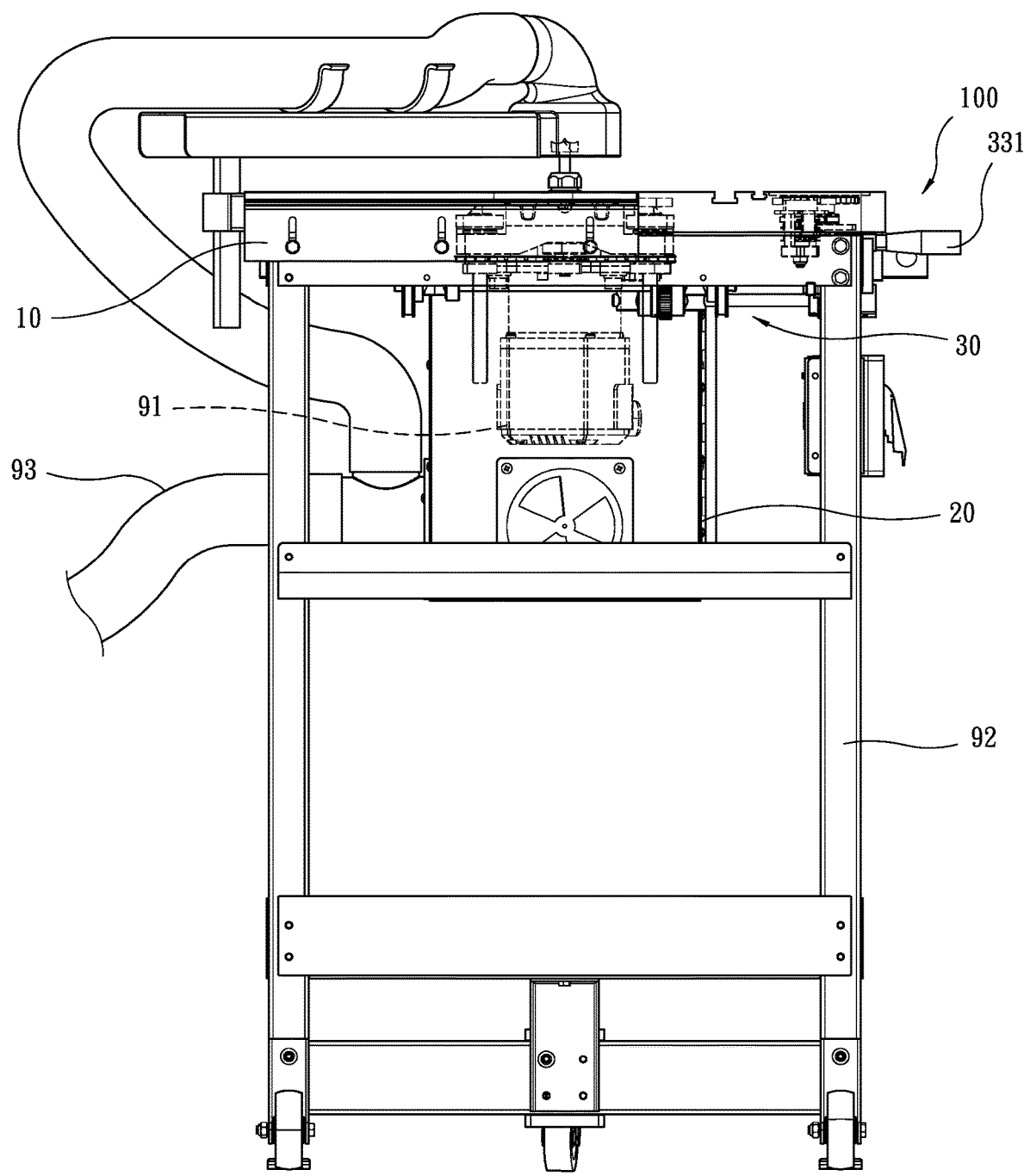
FIG. 3 is a side view to show the wood working machine with the lift device of the present invention.
Figure 4:
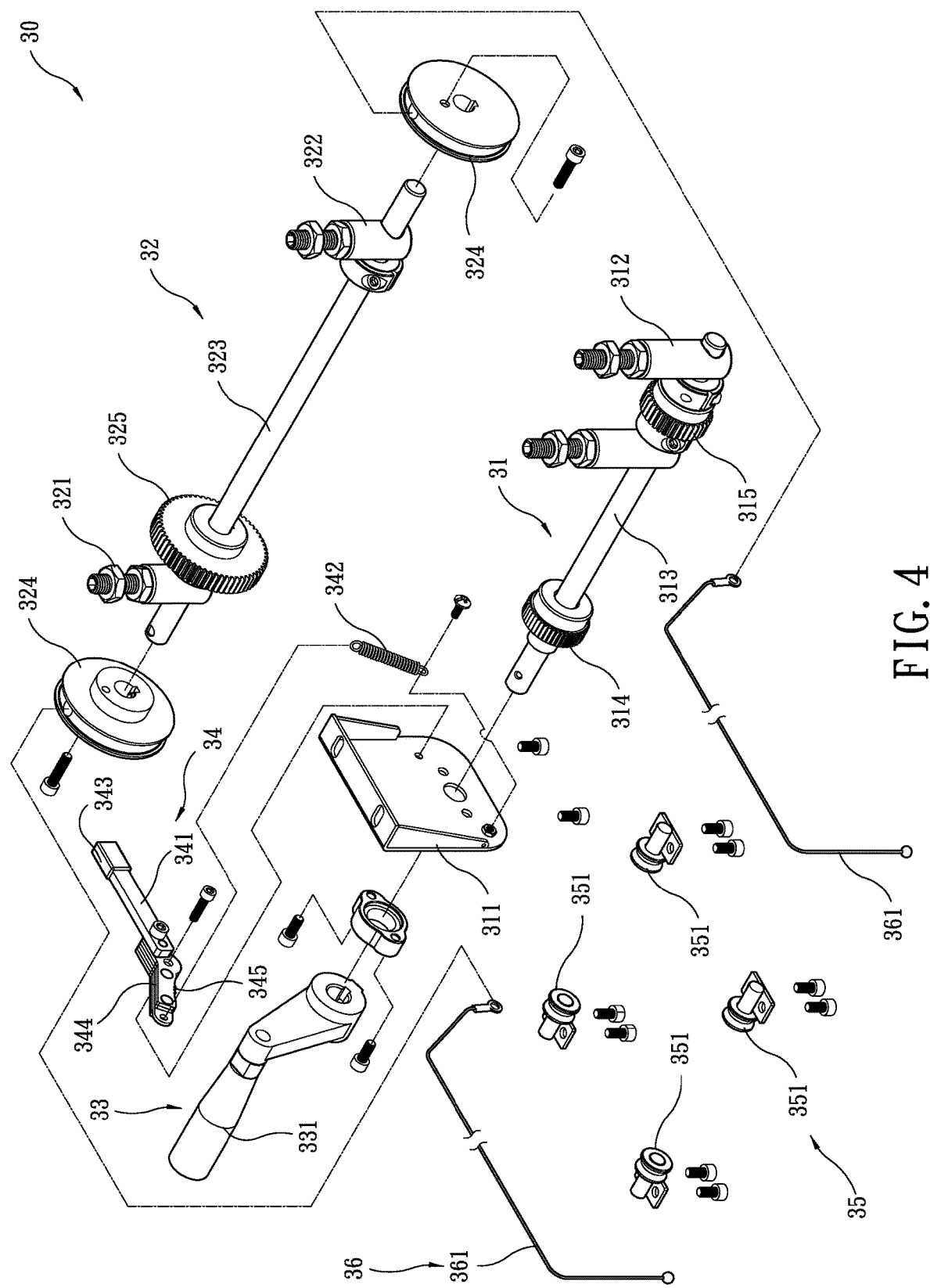
FIG. 4 is an exploded view of the lift device of the present invention.

As shown in FIGS. 2 and 3, a machining device 91 is installed to the working table 10 so as to proceed machining to objects on the working table 10. The working table 10 is supported on a base 92 which is put on the floor so that the working table 10 is located at a certain height.

As shown in FIG. 2, the dust collection box 20 is a box with an open top and multiple flanges 21 respectively extend from the top of four sidewalls of the dust collection box 20. Each of two opposite flanges 21 has at least two connection portions 22 formed therein which are located symmetrically to each other. Each of the flanges 21 includes at least one hole 24 which is an elongate hole. Each of the at least two connection portions 22 of the dust collection box 20 includes a large bore 221, a small bore 222 and a path 223. The path 223 communicates between the large bore 221 and the small bore 222, and the path 223 includes at least one turning portion and is an L-shaped path. The dust collection box 20 has a suction tube 23 connected to one sidewall thereof so as to be cooperated with a vacuum device 93 as shown in FIG. 3 to suck the wood powder and debris from the dust collection box 20.

As shown in FIGS. 2 to 7, the lift device 30 having a driving shaft unit 31, a passive shaft unit 32, a rotary unit 33, a break unit 34, a pulley unit 35 and a cable unit 36. The driving shaft unit 31 has a first seat 311, a second seat 312 and a driving shaft 313. The first seat 311 and the second seat 312 are fixed to the underside of the working table 10, and the driving shaft 313 extends through the first seat 311 and the second seat 312. The driving shaft 313 has a first gear 314 and a second gear 315 mounted thereto.

The passive shaft unit 32 is connected to the underside of the working table 10. The passive shaft unit 32 includes a third seat 321, a fourth seat 322 and a passive shaft 323. The third seat 321 and the fourth seat 322 are fixed to the underside of the working table 10. The passive shaft 323 extends through the third seat 321 and the fourth seat 322. A third gear 325 and at least two wheels 324 are connected to the passive shaft unit 32. The third gear 325 is mounted to the passive shaft 323 and engaged with the second gear 315. The at least two wheels 324 are fixed to the two ends of the passive shaft 323.

The rotary unit 33 is connected to one end of the driving shaft 313 so that when rotating the rotary unit 33, the driving shaft 313 is rotated. In this embodiment, the rotary unit 3 is a crank.

The break unit 34 includes a break member 341 and a resilient member 342. A control portion 343 and a break portion 344 are respectively formed on the two ends of the break member 341. The break portion 344 is pivotably connected to the first seat 311 and has a rack 345 formed thereto. The break member 341 is pviotable between a break position and a loose position. The resilient member 342 is connected between the first seat 311 and the break portion 344. The resilient member 342 maintains the break member 341 at the break position where the rack 345 is engaged with the first gear 314 to prevent the driving shaft 313 from self-rotating. In this embodiment, the resilient member 342 of the break unit 34 is a spring.

The pulley unit 35 has multiple pulleys 351 which are connected to the underside of the working table 10.

The cable unit 36 has at least two cables 361, and each cable 361 has the first end fixed to the wheel 324 corresponding thereto, and the second end of each cable 361 reeves the pulley 351 corresponding thereto and is connected with the connection portion 22 corresponding thereto so as to be connected to the connection portion 22 of the dust collection box 20 corresponding thereto. The second end of the cable 361 extends through the large 221 and moves along the path 223 and is located within the small hole 222 so as to be connected to dust collection box 20.

Figure 5:
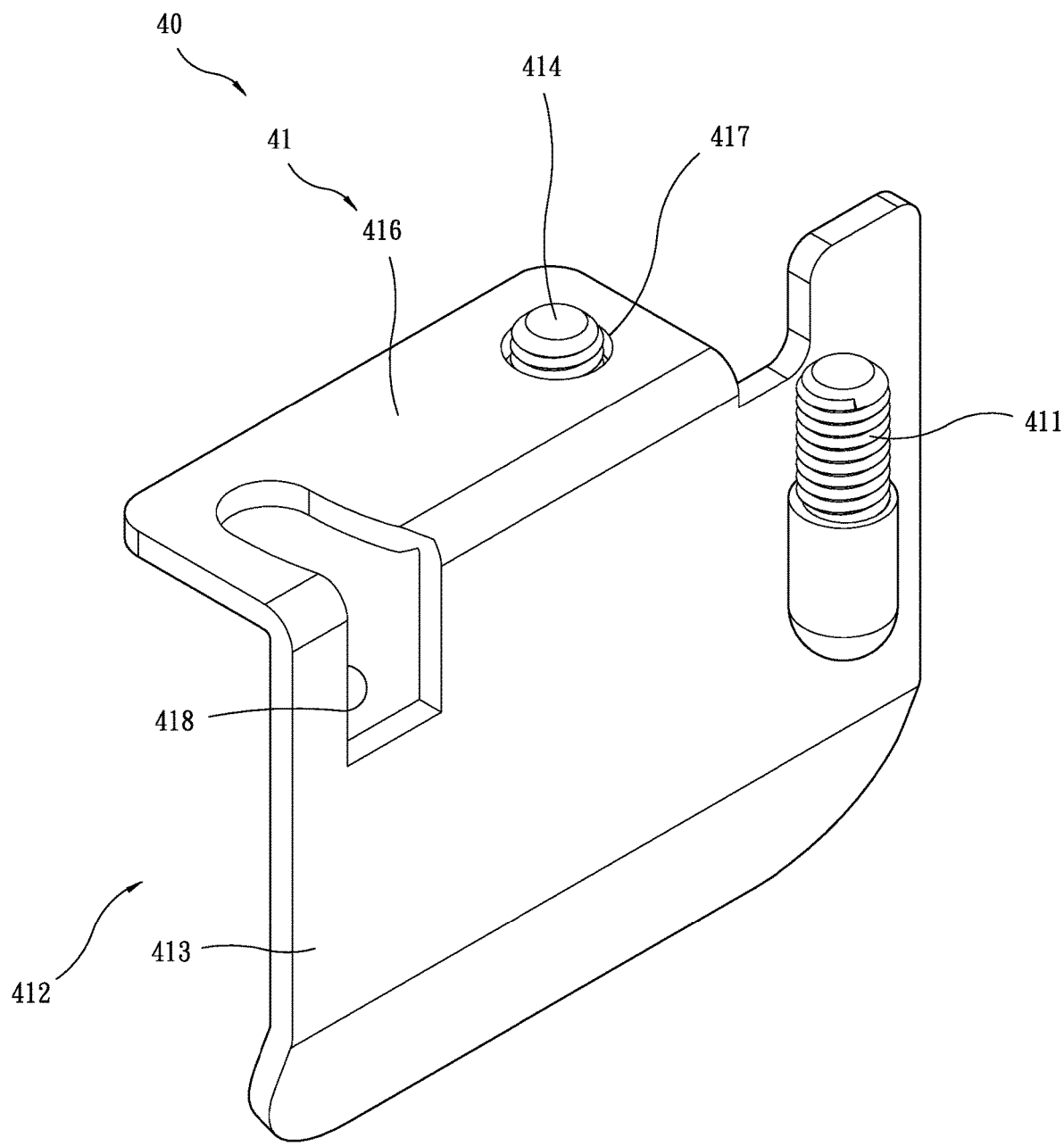
FIG. 5 is a perspective view to show the pivotal member of the positioning device of the lift device of the present invention.
Figure 6:
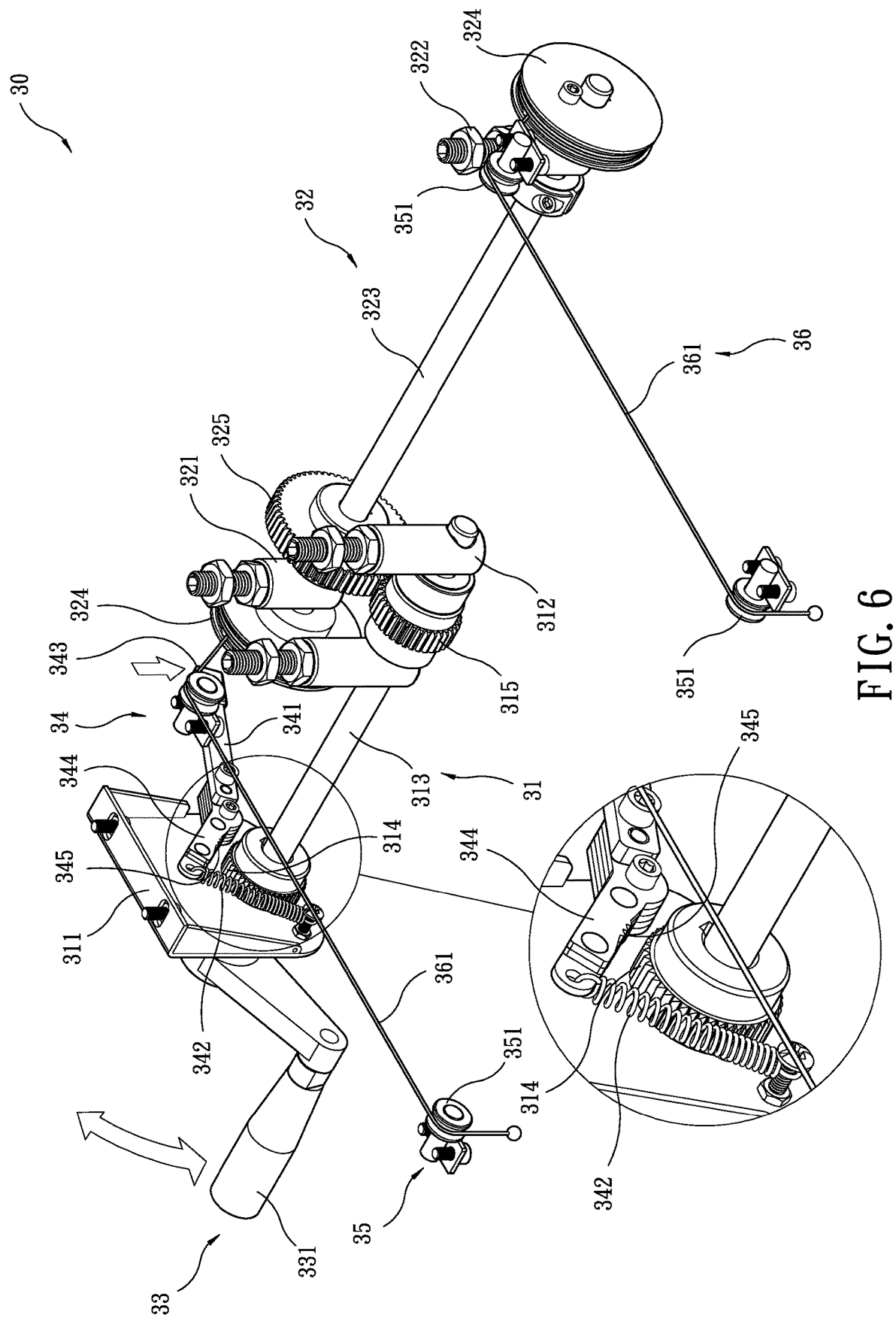
FIG. 6 illustrates the lift device of the present invention.
Figure 7:
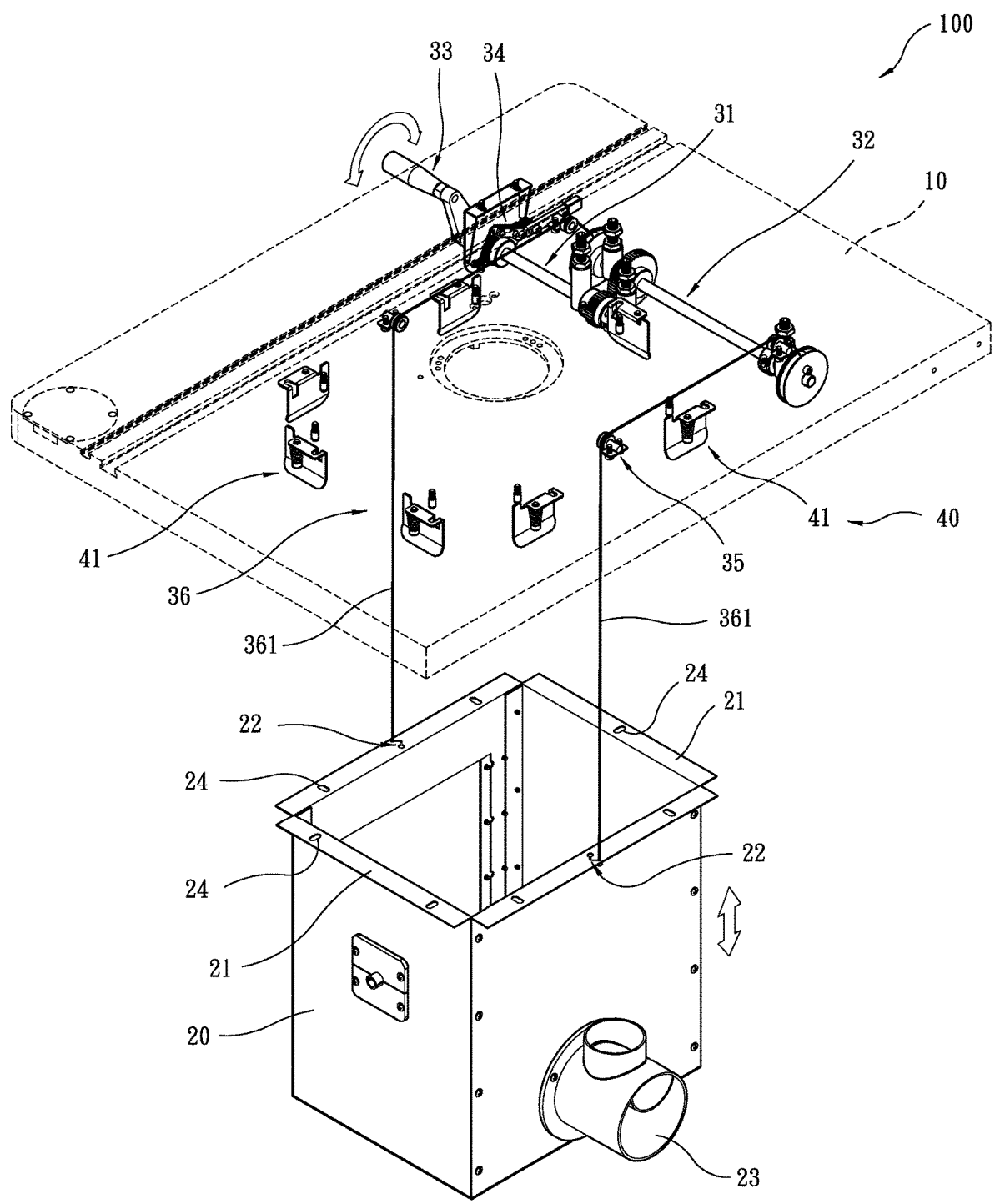
FIG. 7 shows that the dust collection box is lifted or lowered by the lift device of the present invention.
Figure 12:
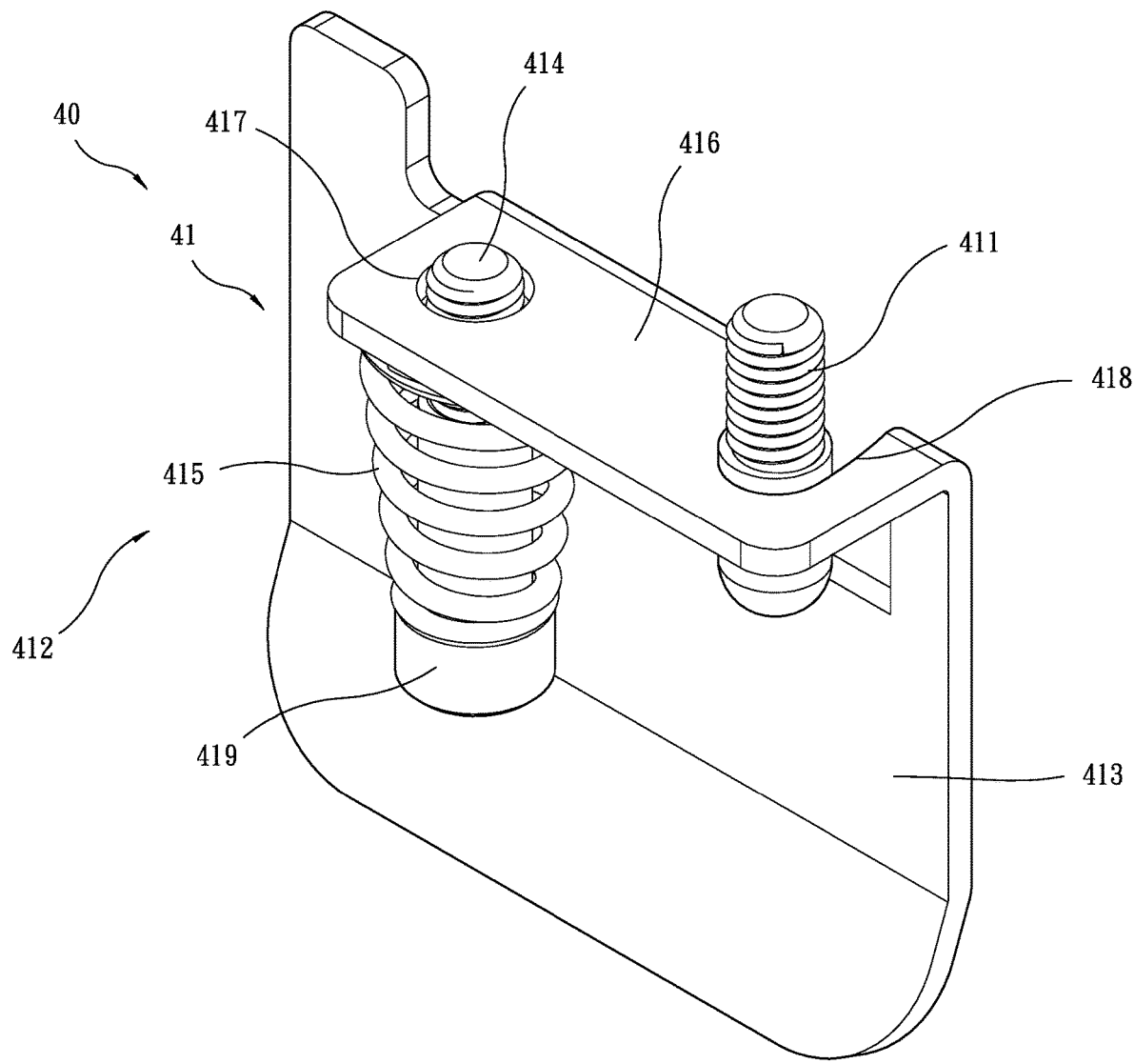
FIG. 12 shows that the post is accommodated in the slots of the pivotal member.

As shown in FIGS. 2, 5 and 12, the positioning device 40 includes multiple positioning units 41 pivotably connected to the underside of the working table 10. Each positioning unit 41 includes a post 411 which includes the first end thereof (with threads) fixed to the underside of the working table 10, and the second end of the post 411 of each positioning unit 41 is exposed beyond the underside of the working table 10. A pivotal member 412 is pivotably connected to the underside of the working table 10. The pivotal member 412 includes a plate 413, a locking member 414 and a spring 415. The plate 413 includes a support 416 bent from the top thereof. The support 416 includes an aperture 417 and a slot 418, wherein the slot 418 communicates through a portion of the support 416 and a portion of the plate 413. The locking member 414 includes the first end thereof (with threads) extending through the aperture 417 and fixed to the underside of the working table 10, and the second end of the locking member 414 includes an enlarged end 419. The plate 413 is located beside the post 411 with a distance between the plate 413 and the post 411. The post 411 is located at the pivotal trace of the slot 418. The spring 415 is mounted to the locking member 414 and biased between the enlarged end 419 and the support 416 so that when the pivotal member 412 is urged against the underside of the working table 10.

Figure 8:
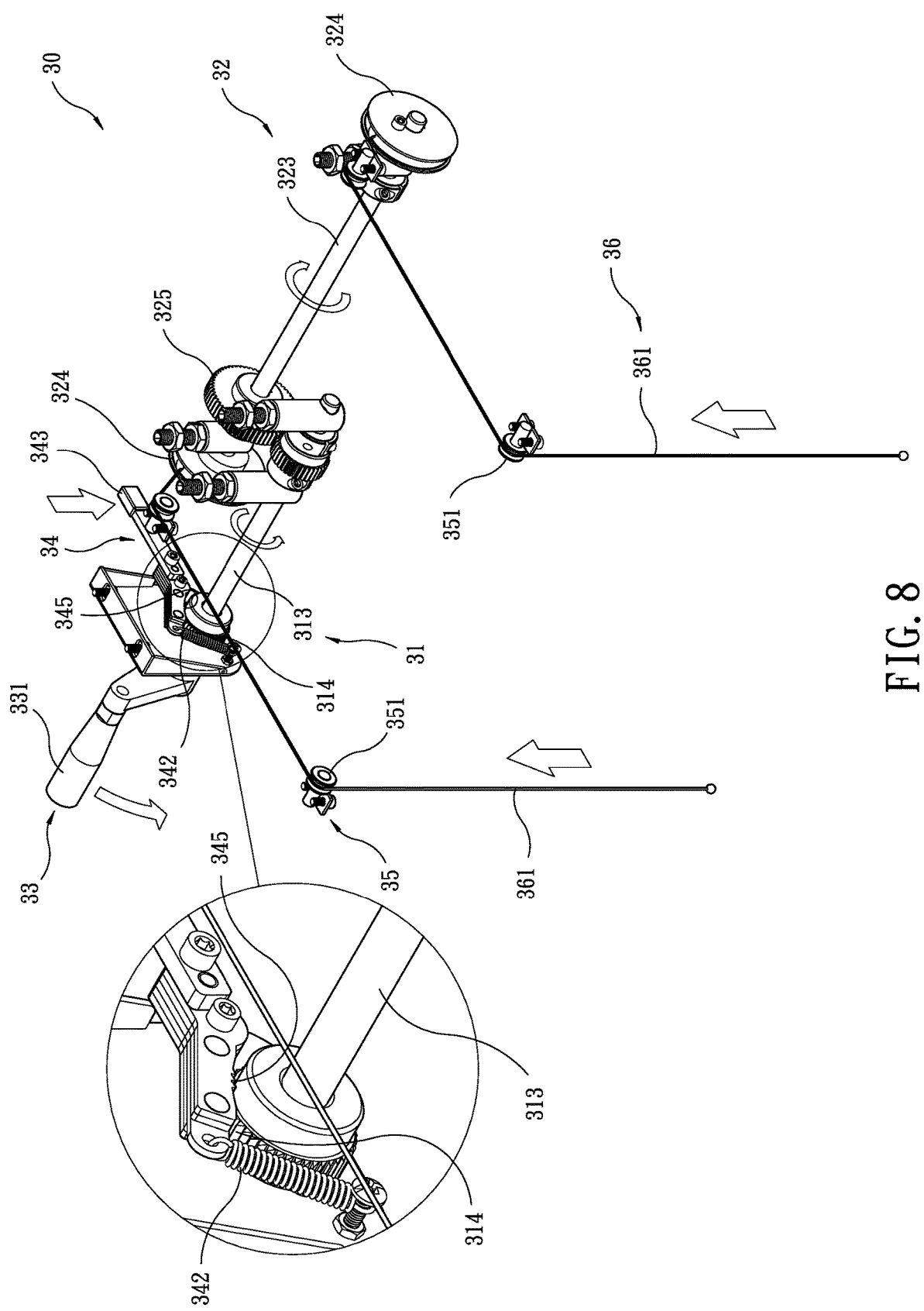
FIG. 8 shows the cables are pulled upward by the lift device of the present invention.
Figure 9:
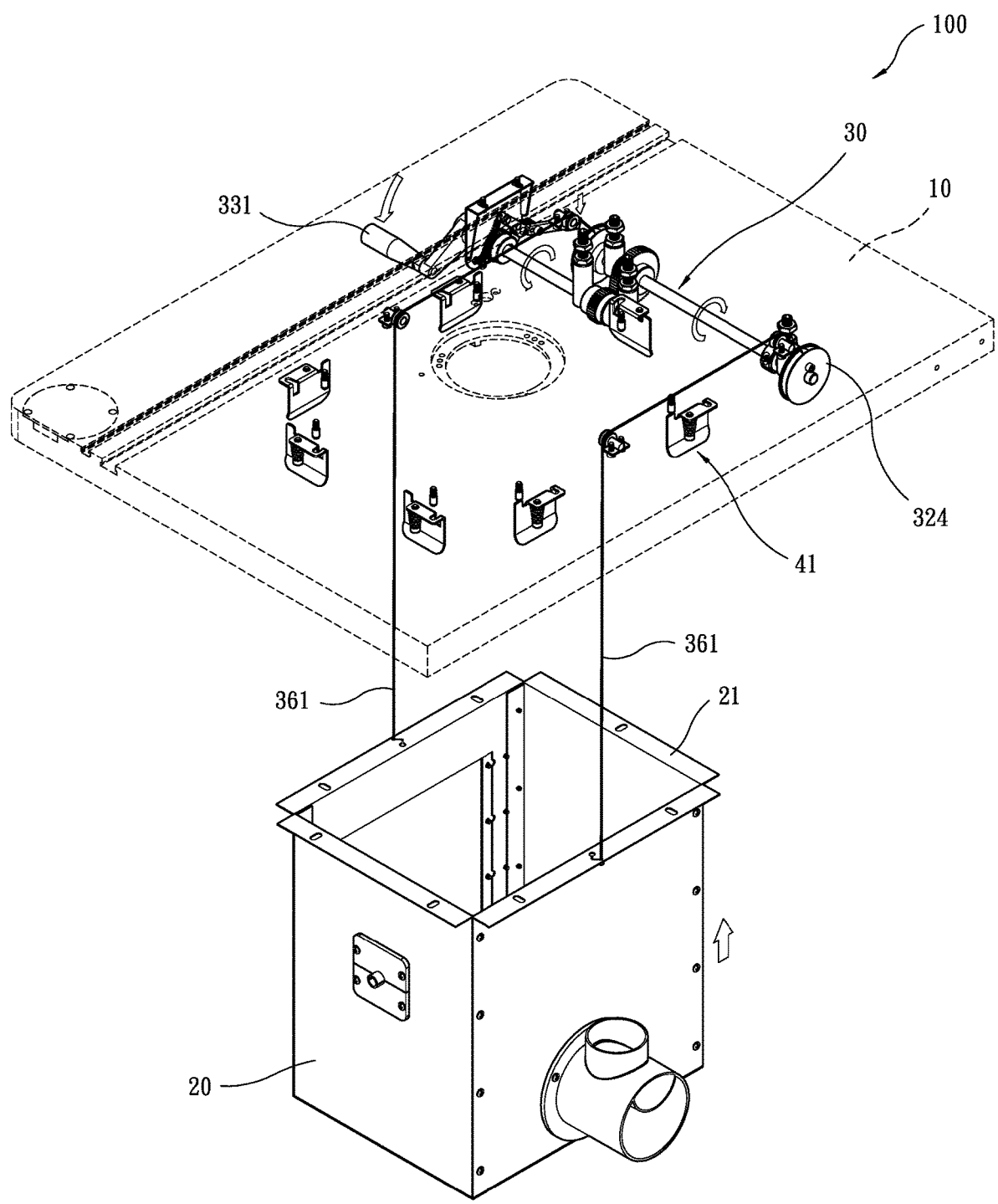
FIG. 9 shows that the rotary unit is rotated to lift the dust collection box.

When the dust collection box 20 is to be lifted by the lift device 30, the user presses the control portion 343 of the lift device 30 as shown in FIG. 8 by one hand, so that the break member 341 reacts against the force of the resilient member 342, and the break member 341 changes from the break position to the loose position. The driving shaft 313 is not restricted by the break unit 34. The user uses the other hand to rotate the crank 331 so as to rotate the driving shaft 313, the second gear 315, the third gear 325, the passive shaft 323 and the wheels 324. The wheels 324 rotate to scroll the cables 361 to lift the dust collection box 20 as shown in FIG. 9.

Figure 10:
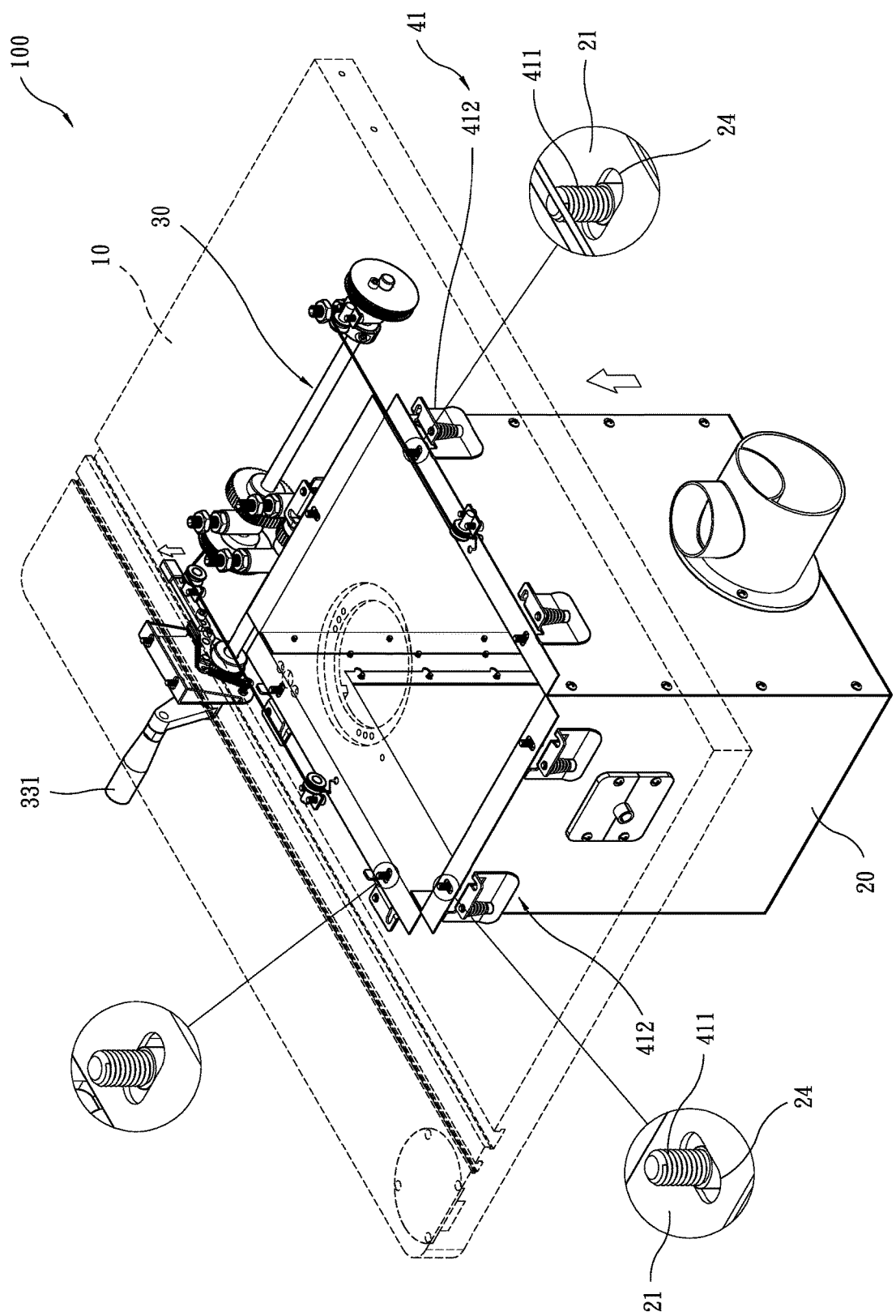
FIG. 10 shows that the dust collection box is lifted and the posts of the positioning unit extend through the holes of the dust collection box.
Figure 11:
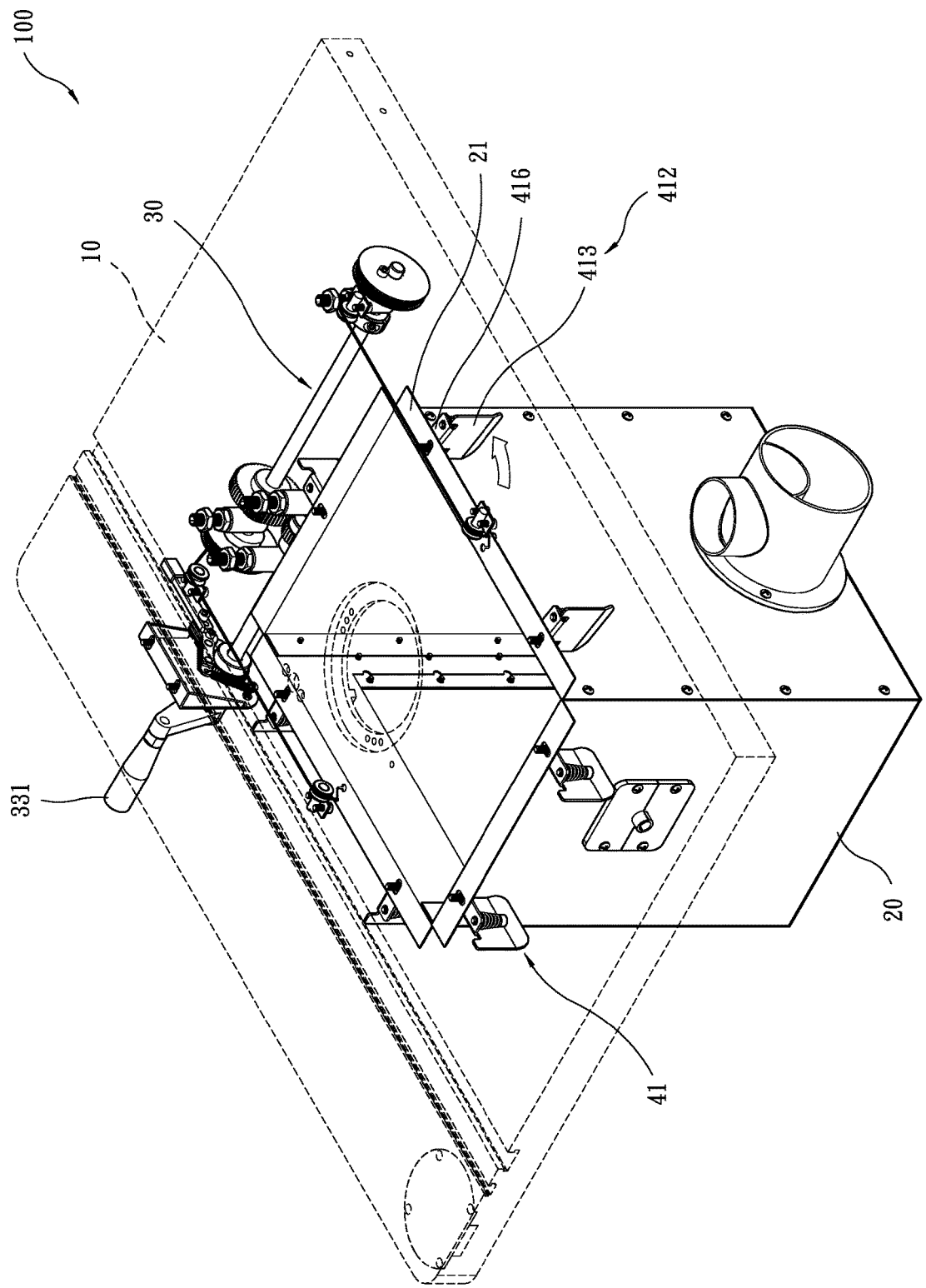
FIG. 11 shows that the pivotal members are pivoted to support on the flanges of the dust collection box.

When the flanges 21 of the dust collection box 20 approach the underside of the working table 10, the posts 411 extend through the holes 24 in the flanges 21 as shown in FIG. 10. When the user releases the control portion 343 of the break unit 34, the user can move to another position to pivot the plates 413 as shown in FIG. 11 to locate the supports 416 beneath the flanges 21 to support the dust collection box 20. This allows the dust collection box 20 to be well supported and also reduces the weight that the cables 361 bear. After the plates 413 are pivoted, the posts 411 are located within the slots 418 as shown in FIG. 12. The force of the springs 415 restrict the plates 413 from self-rotating.

Figure 13:
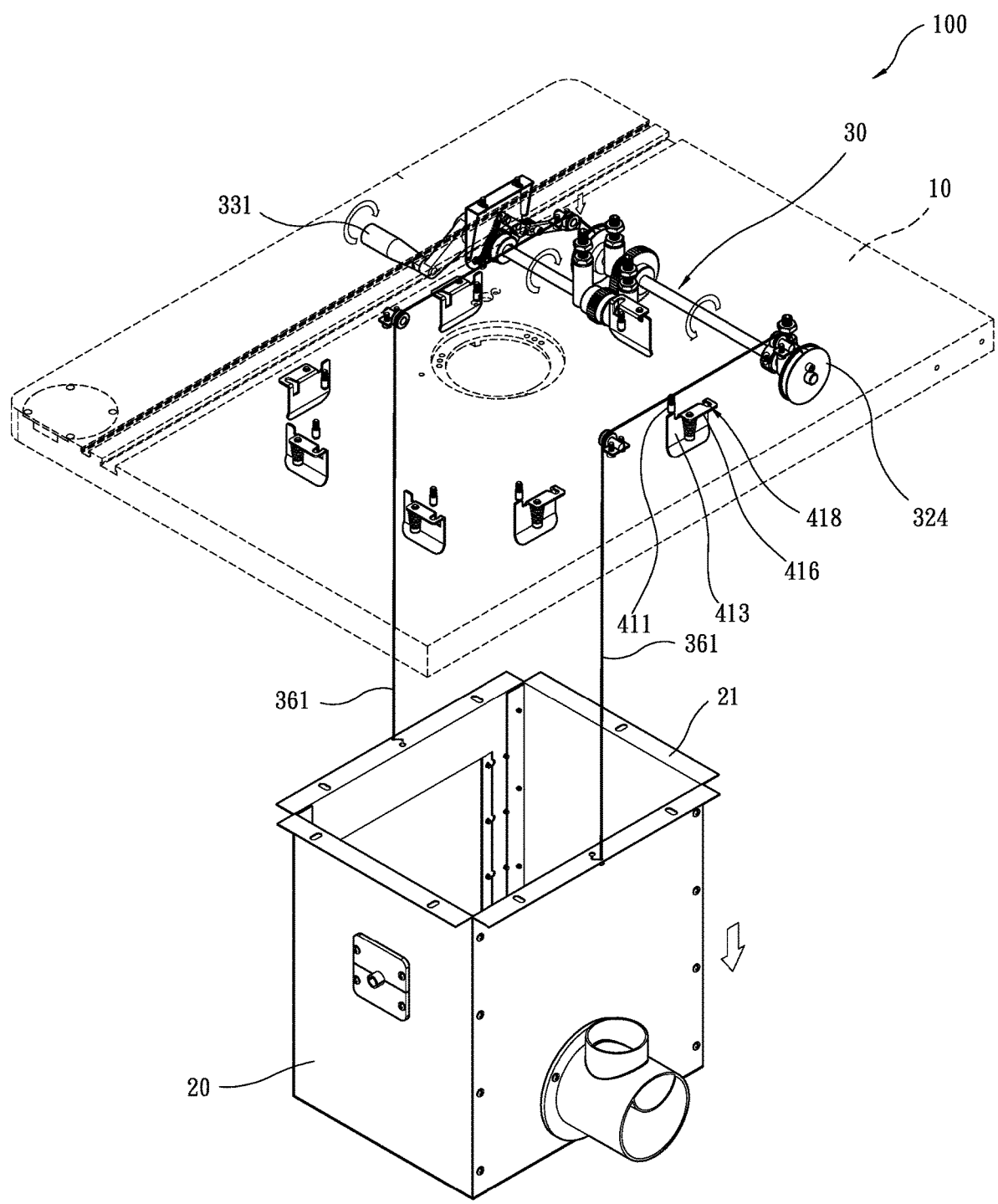
FIG. 13 shows that the dust collection box is lowered.

Besides, when cleaning the dust collection box 20 or maintaining the machining device 91, the plates 413 are pivoted in the opposite direction and remove the supports 416 from the flanges 21, and the posts 411 are separated from the slots 418. The user then press the control portion 343 of the break unit 34 and rotates the crank 331 in opposite direction to lower the dust collection box 20 as shown in FIG. 13.

The present invention allows the user to easily lift or lower the dust collection box 20 without need of second person to help. During the processes, the user does not need to support dust collection box 20 by hands so as to protect the user.

Although in this embodiment, the rotary unit 3 is a crank, the driving shaft unit 31 may be cooperated with an electric motor and a gear box to rotate the driving shaft 313.

While we have shown and described the embodiment in accordance with the present invention, it should be clear to those skilled in the art that further embodiments may be made without departing from the scope of the present invention.

What is claimed is:

1. A lift device for a dust collection box of a wood working machine, comprising:
a working table;
a dust collection box having at least two connection portions;
a lift device having a driving shaft unit, a passive shaft unit, a rotary unit, a break unit, a pulley unit and a cable unit, the driving shaft unit having a first seat, a second seat and a driving shaft, the first seat and the second seat fixed to an underside of the working table, the driving shaft extending through the first seat and the second seat, the driving shaft having a first gear and a second gear mounted thereto;
the passive shaft unit connected to the underside of the working table, a third gear and at least two wheels connected to the passive shaft unit, the third gear engaged with the second gear;
the rotary unit connected to the driving shaft to rotate the driving shaft;
the break unit having a break member and a resilient member, a control portion and a break portion respectively formed on two ends of the break member, the break portion pivotably connected to the first seat and having a rack formed thereto, the break member being pviotable between a break position and a loose position, the resilient member connected between the first seat and the break portion, the resilient member maintaining the break member at the break position where the rack is engaged with the first gear to prevent the driving shaft from self-rotating;
the pulley unit having multiple pulleys which are connected to the underside of the working table, and
the cable unit having at least two cables, each cable having a first end fixed to the wheel corresponding thereto, and a second end of each cable reeving the pulley corresponding thereto and connected with the connection portion corresponding thereto.

2. The lift device for a dust collection box of a wood working machine as claimed in claim 1, wherein each of the at least two connection portions of the dust collection box includes a large bore, a small bore and a path, the path communicates between the large bore and the small bore, the path includes at least one turning portion.

3. The lift device for a dust collection box of a wood working machine as claimed in claim 1, wherein the passive shaft unit includes a third seat, a fourth seat and a passive shaft, the third seat and the fourth seat are fixed to the underside of the working table, the passive shaft extends through the third seat and the fourth seat, the third gear is mounted to the passive shaft, the at least two wheels are fixed to the passive shaft.

4. The lift device for a dust collection box of a wood working machine as claimed in claim 1, wherein the rotary unit is a crank.

5. The lift device for a dust collection box of a wood working machine as claimed in claim 1, wherein the driving shaft unit includes an electric motor and a gear box.

6. The lift device for a dust collection box of a wood working machine as claimed in claim 1, wherein the resilient member of the break unit is a spring.

7. The lift device for a dust collection box of a wood working machine as claimed in claim 1, wherein when the control portion is pressed, the break member is pivoted from the break position to the release position, and the rack is disengaged from the first gear.

8. The lift device for a dust collection box of a wood working machine as claimed in claim 1, wherein the working table includes a positioning device connected thereto, the positioning device includes multiple positioning units pivotably connected to the underside of the working table, each positioning unit includes a post which includes a first end thereof fixed to the underside of the working table, a second end of the post of each positioning unit is exposed beyond the underside of the working table, a pivotal member is pivotably connected to the underside of the working table, the pivotal member includes a plate, a locking member and a spring, the plate includes a support bent from a top thereof, the support includes an aperture and a slot, the slot communicates through a portion of the support and a portion of the plate, the locking member includes a first end thereof extending through the aperture and being fixed to the underside of the working table, and a second end of the locking member includes an enlarged end, the plate is located beside the post, the post is located at a pivotal trace of the slot, the spring is mounted to the locking member and biased between the enlarged end and the support.

9. The lift device for a dust collection box of a wood working machine as claimed in claim 8, wherein the dust collection box includes multiple flanges extending from a top thereof, the at least two connection portions are located in the flanges and located symmetrically to each other, the flanges each include a hole, when the dust collection box is lifted by the lift device and contacts the underside of the working table, the posts of the positioning units extend through the holes of the dust collection box, each of the plates is pivoted about the locking member corresponding thereto to insert the support beneath the flange corresponding thereto so as to support the dust collection box, the post is accommodated in the slot corresponding thereto.

* * * * *